US012605833B2

(12) United States Patent
Kinoshita et al.

(10) Patent No.: US 12,605,833 B2
(45) Date of Patent: Apr. 21, 2026

(54) ROBOT SYSTEM AND ROBOT

(71) Applicant: KAWASAKI JUKOGYO KABUSHIKI KAISHA, Kobe (JP)

(72) Inventors: Tomohiro Kinoshita, Kobe (JP); Masataka Koyama, Kobe (JP); Hiroharu Suzuki, Kobe (JP); Shogo Katsura, Kobe (JP); Satoshi Hashimoto, Kobe (JP); Yasuhiro Tano, Kobe (JP); Kazuki Kodama, Kobe (JP); Akinori Igarashi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 51 days.

(21) Appl. No.: 18/706,526

(22) PCT Filed: Dec. 22, 2021

(86) PCT No.: PCT/JP2021/047511
§ 371 (c)(1),
(2) Date: May 1, 2024

(87) PCT Pub. No.: WO2023/119470
PCT Pub. Date: Jun. 29, 2023

(65) Prior Publication Data
US 2025/0018568 A1 Jan. 16, 2025

(51) Int. Cl.
*B25J 9/16* (2006.01)
(52) U.S. Cl.
CPC .................................. *B25J 9/1664* (2013.01)

(58) Field of Classification Search
CPC ...... B25J 9/1679; B25J 9/1664; B25J 9/1628; G05B 2219/45104; G05B 2219/45065
See application file for complete search history.

(56) References Cited

U.S. PATENT DOCUMENTS

| | | | | | |
|---|---|---|---|---|---|
| 4,680,524 A | * | 7/1987 | Do | .............................. | H02P 8/36 318/696 |
| 7,458,282 B1 | * | 12/2008 | Wuester, Sr. | ........... | B23P 19/06 414/751.1 |

(Continued)

FOREIGN PATENT DOCUMENTS

| | | |
|---|---|---|
| JP | 2002-331428 A | 11/2002 |
| JP | 2004-337710 A | 12/2004 |

(Continued)

OTHER PUBLICATIONS

Mar. 1, 2022 Search Report issued in International Patent Application No. PCT/JP2021/047511.

*Primary Examiner* — Stephen Holwerda
(74) *Attorney, Agent, or Firm* — Oliff PLC

(57) ABSTRACT

A robot system includes a multi-joint robot arm including a plurality of joints; a robot controller configured or programmed to control movement of the multi-joint robot arm; an interactor configured to interact with a workpiece; a signal output configured to output a moving amount signal based on a moving amount of the interactor arranged on a distal end part of the multi-joint robot arm at a fixed time period; and an interaction controller configured or programmed to control interaction of the interactor with the workpiece based on the moving signal output by the signal output.

10 Claims, 7 Drawing Sheets

(56)                    References Cited

U.S. PATENT DOCUMENTS

| | | | |
|---|---|---|---|
| 2004/0073336 A1* | 4/2004 | Huang | B25J 9/1674 |
| | | | 318/568.11 |
| 2007/0030271 A1 | 2/2007 | Kamiya | |
| 2015/0119214 A1* | 4/2015 | Sasaki | B25J 15/0052 |
| | | | 483/1 |
| 2015/0183113 A1 | 7/2015 | Wakaizumi | |
| 2016/0361818 A1* | 12/2016 | Hiruma | B25J 9/1692 |
| 2017/0225327 A1* | 8/2017 | Yoon | B25J 18/02 |
| 2017/0341200 A1 | 11/2017 | Ueda | |
| 2019/0168389 A1* | 6/2019 | Shino | B25J 13/088 |
| 2019/0275678 A1* | 9/2019 | Takeuchi | B25J 9/163 |
| 2022/0080540 A1* | 3/2022 | Sugioka | B25B 23/145 |

FOREIGN PATENT DOCUMENTS

| | | | |
|---|---|---|---|
| JP | 2006-081955 A | 3/2006 |
| JP | 2015-127080 A | 7/2015 |
| JP | 2016-215438 A | 12/2016 |
| JP | 2017-019059 A | 1/2017 |
| JP | 2017-209754 A | 11/2017 |
| WO | 2017/033832 A1 | 3/2017 |

* cited by examiner

STRAIGHT PART
ROBOT MOVEMENT: HIGH SPEED
TOOL ROTATION SPEED: HIGH SPEED

CORNER PART
ROBOT MOVEMENT: LOW SPEED
TOOL ROTATION SPEED:
          LOW SPEED

STRAIGHT PART
ROBOT MOVEMENT:
          HIGH SPEED
TOOL ROTATION SPEED:
          HIGH SPEED

200

100

INTERACTION CONTROLLER 40

LASER GENERATOR 32

10

32a

CONTROLLER 20

SIGNAL OUTPUT 22

ROBOT CONTROLLER 21

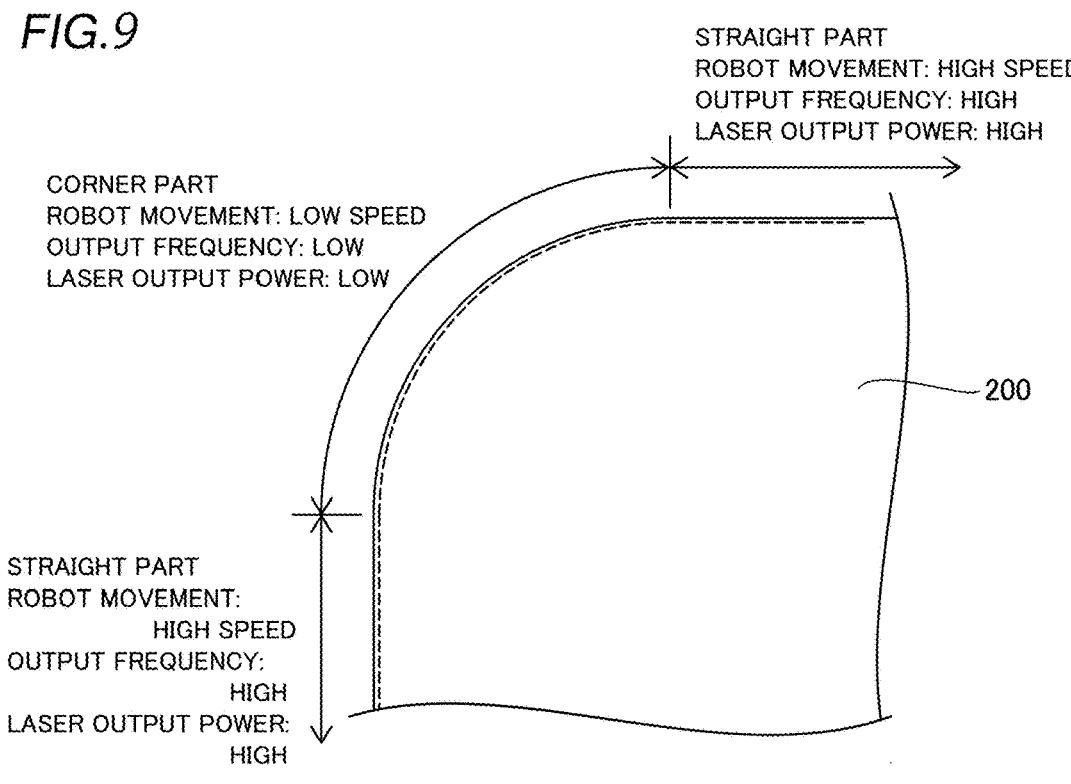

STRAIGHT PART
ROBOT MOVEMENT: HIGH SPEED
OUTPUT FREQUENCY: HIGH
LASER OUTPUT POWER: HIGH

CORNER PART
ROBOT MOVEMENT: LOW SPEED
OUTPUT FREQUENCY: LOW
LASER OUTPUT POWER: LOW

200

STRAIGHT PART
ROBOT MOVEMENT:
        HIGH SPEED
OUTPUT FREQUENCY:
        HIGH
LASER OUTPUT POWER:
        HIGH

FIG.10

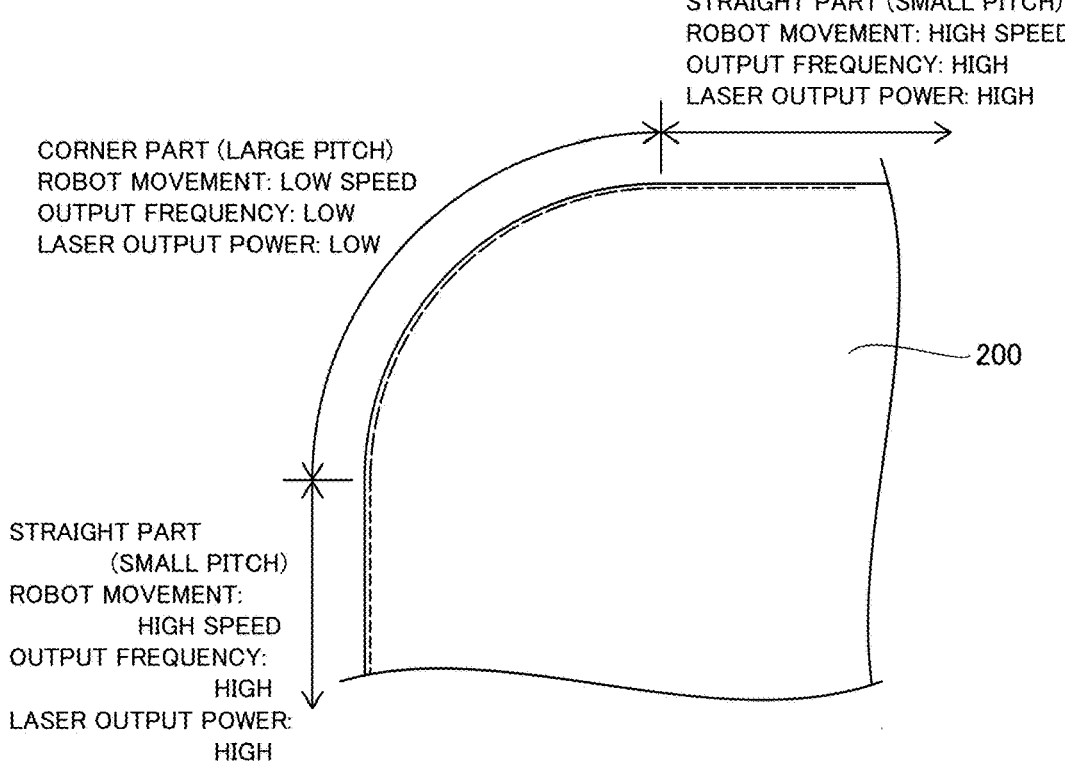

STRAIGHT PART (SMALL PITCH)
ROBOT MOVEMENT: HIGH SPEED
OUTPUT FREQUENCY: HIGH
LASER OUTPUT POWER: HIGH

CORNER PART (LARGE PITCH)
ROBOT MOVEMENT: LOW SPEED
OUTPUT FREQUENCY: LOW
LASER OUTPUT POWER: LOW

200

STRAIGHT PART
        (SMALL PITCH)
ROBOT MOVEMENT:
        HIGH SPEED
OUTPUT FREQUENCY:
        HIGH
LASER OUTPUT POWER:
        HIGH

INTERACTION CONTROLLER — 40

100

CONTROLLER — 20

SIGNAL OUTPUT — 22

ROBOT CONTROLLER — 21

ROBOT SYSTEM AND ROBOT

TECHNICAL FIELD

The present disclosure relates to a robot system and a robot, and in particular to a robot system and a robot including a multi-joint robot arm.

BACKGROUND ART

Robots including a multi-joint robot arm are known in the art (for example, see Patent Document 1).

Japanese Patent Laid-Open Publication No. JP 2002-331428 discloses such a robot system including a multi-joint robot arm having a plurality of joints, a robot controller configured to move the multi-joint robot arm, and an interactor configured to screw a screw into a workpiece. In this robot system, the multi-joint robot arm presses the interactor against the screw, and the interactor screws the screw into the workpiece by rotating the screw.

PRIOR ART

Patent Document

Patent Document 1: Japanese Patent Laid-Open Publication No. JP 2002-331428

SUMMARY OF THE INVENTION

Problems to be Solved by the Invention

In the above Japanese Patent Laid-Open Publication No. JP 2002-331428, the multi-joint robot arm presses the interactor against the screw, and the interactor screws the screw into the workpiece by rotating the screw. For this reason, if a velocity of the interactor, which is pressed against the screw by the multi-joint robot, is different from a velocity of the screw, which is screwed by rotation of the screw by the interactor and moved in an axial direction, the interactor will be pressed against the screw too much or the interactor will be insufficiently pressed against the screw, which can cause improper interaction. In such a case, it will be difficult to properly screw the screw into the workpiece. Consequently, the interactor cannot accurately interact with the workpiece.

The present disclosure is intended to solve the above problem, and one object of the present disclosure is to provide a robot system and a robot capable of accurately interacting with a workpiece by using an interactor when interacting with the workpiece while moving the interactor relative to the workpiece by using a multi-joint robot arm.

Means for Solving the Problems

In order to attain the aforementioned object, a robot system according to a first aspect of the present disclosure includes a multi-joint robot arm including a plurality of joints; a robot controller configured or programmed to control movement of the multi-joint robot arm; an interactor configured to interact with a workpiece; a signal output configured to output a moving amount signal based on a moving amount of the workpiece or the interactor arranged on a distal end part of the multi-joint robot arm at a fixed time period; and an interaction controller configured or programmed to control interaction of the interactor with the workpiece based on the moving signal output by the signal output.

In the robot system according to the first aspect, as discussed above, the signal output configured to output a moving amount signal based on a moving amount of the workpiece or the interactor arranged on a distal end part of the multi-joint robot arm at a fixed time period is provided. Also, the interaction controller configured or programmed to control interaction of the interactor with the workpiece based on the moving signal output by the signal output is provided. Accordingly, the interaction controller can acquire the moving amount of the workpiece or the interactor at a fixed time period, and can control interaction of the interactor in synchronization with movement of the workpiece or the interactor. As a result, it is possible to accurately interact with the workpiece by using the interactor when interacting with the workpiece while moving the interactor relative to the workpiece by using the multi-joint robot arm. For example, in a case in which a screw is screwed into a workpiece, a velocity of the interactor, which is pressed against the screw by the multi-joint robot, can be synchronized with a moving velocity of the screw, which is screwed by rotation of the screw by the interactor and moved in an axial direction, it is possible to accurately fasten the screw while properly pressing the interactor against the screw. In addition, because the moving amount signal is output at the fixed time period, the interaction controller can stably control interaction at the fixed time period. Consequently, it is possible to prevent delay in control.

A robot according to a second aspect includes a multi-joint robot arm including a plurality of joints; a robot controller configured or programmed to control movement of the multi-joint robot arm; and a signal output configured to output a moving amount signal based on a moving amount of the workpiece arranged on a distal end part of the multi-joint robot arm or an interactor arranged on the distal end part of the multi-joint robot arm to interact with the workpiece at a fixed time period.

In the robot according to the second aspect, as discussed above, a signal output configured to output a moving amount signal based on a moving amount of the workpiece arranged on a distal end part of the multi-joint robot arm or an interactor arranged on the distal end part of the multi-joint robot arm to interact with the workpiece at a fixed time period is provided. Accordingly, it is possible to control interaction of the interactor in synchronization with movement of the workpiece or the interactor based on the moving amount of the workpiece or the interactor at a fixed time period. As a result, it is possible to provide a robot capable of accurately interacting with the workpiece by using the interactor when interacting with the workpiece while moving the interactor relative to the workpiece by using the multi-joint robot arm. For example, in a case in which a screw is screwed into a workpiece, a velocity of the interactor, which is pressed against the screw by the multi-joint robot, can be synchronized with a moving velocity of the screw, which is screwed by rotation of the screw by the interactor and moved in an axial direction, it is possible to accurately fasten the screw while properly pressing the interactor against the screw. In addition, because the moving amount signal is output at the fixed time period, it is possible to stably control interaction of the interactor at the fixed time period. Consequently, it is possible to prevent delay in control.

Effect of the Invention

According to this disclosure, as discussed, it is possible to accurately interact with a workpiece by using an interactor when interacting with the workpiece while moving the interactor relative to the workpiece by using a multi-joint robot arm.

BRIEF DESCRIPTION OF THE DRAWINGS

FIG. 9 is a diagram illustrating first exemplary interaction of an interactor of the robot system according to the fourth embodiment.

FIG. 10 is a diagram illustrating second exemplary interaction of the interactor of the robot system according to the fourth embodiment.

FIG. 13 is a diagram schematically showing a robot system according to a modified example of the fifth embodiment.

MODES FOR CARRYING OUT THE INVENTION

First Embodiment

Figure 1:
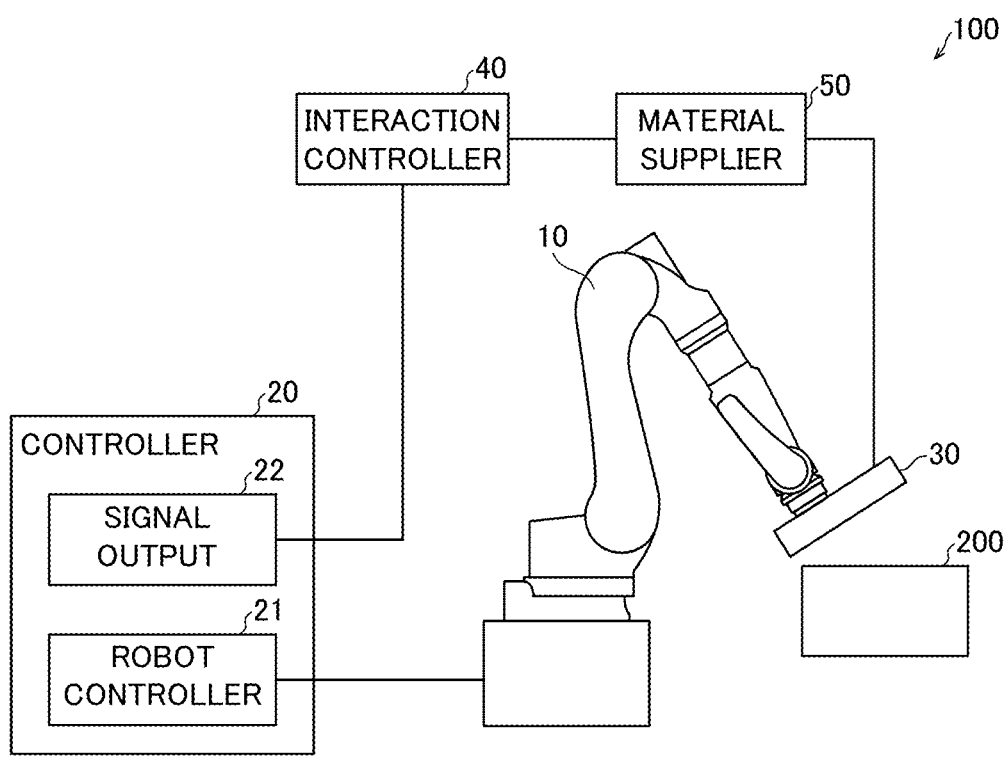
FIG. 1 is a diagram showing a configuration of a robot system according to a first embodiment from a control view point.
Figure 2:
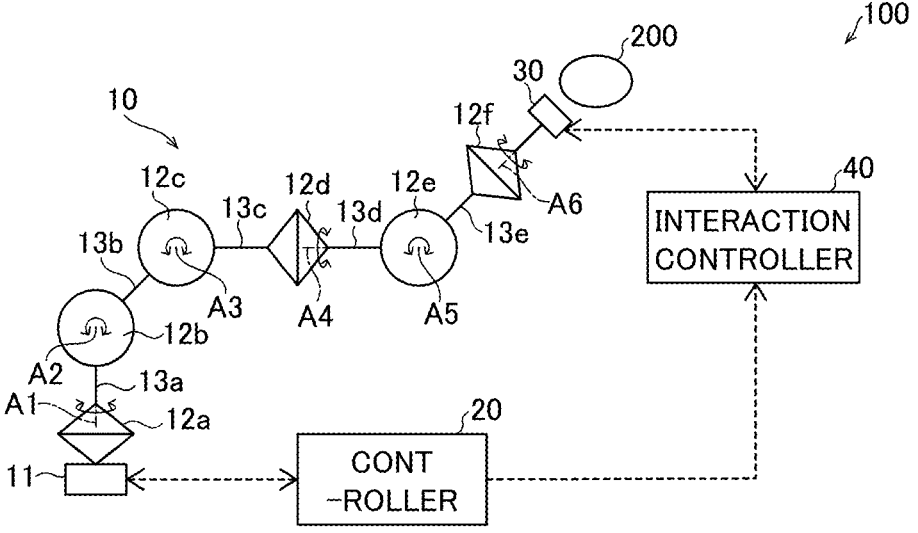
FIG. 2 is a diagram schematically showing the robot system according to the first embodiment.
Figures 3, 4:
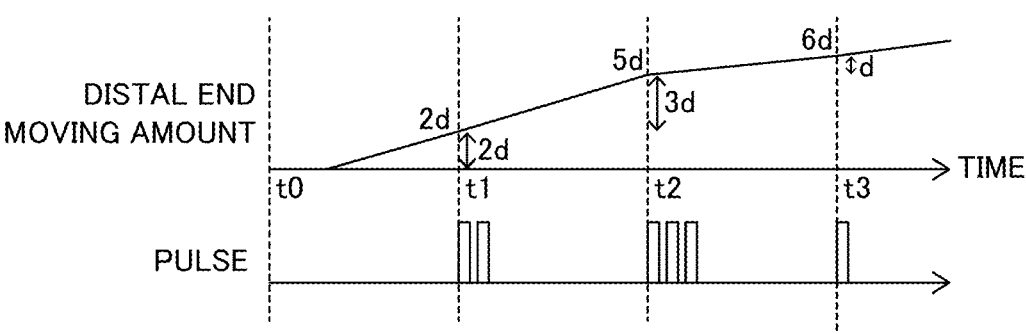
FIG. 3 is a chart illustrating moving amount signals output from a signal output of the robot system according to the first embodiment.
FIG. 4 is a diagram schematically showing a robot system according to a second embodiment.

The following description describes a configuration of a robot system 100 according to a first embodiment with reference to FIGS. 1 to 3.

As shown in FIG. 1, the robot system 100 interacts with a workpiece 200. The robot system 100 includes a multi-joint robot arm 10, and a controller 20 configured or programmed to control the multi-joint robot arm 10. The robot system 100 further includes an interactor 30, and an interaction controller 40 configured or programmed to control the interactor 30. The robot system 100 further includes a material supplier 50 configured to supply a material for the interaction to the interactor 30.

For example, the multi-joint robot arm 10 is an industrial robot, medical robot, or the like. The multi-joint robot arm 10 includes a plurality of joints. For example, the multi-joint robot arm 10 includes a 6-axis vertical multi-joint arm. The multi-joint robot arm 10 is actuated by AC power supplied from the outside.

The controller 20 includes a robot controller 21, and a signal output 22 as shown in FIG. 1.

The robot controller 21 is configured or programmed to control movement of the multi-joint robot arm 10. Specifically, the robot controller 21 is configured or programmed to control power supplied to electric motors mounted in the joints of the multi-joint robot arm 10 so as to control the movement of the multi-joint robot arm 10. The robot controller 21 includes a central processing unit (CPU), and a memory. The robot controller 21 is configured or programmed to control the movement of the multi-joint robot arm 10 by executing a predetermined program. The robot controller 21 receives instructions (teaching) relating to the movement of the multi-joint robot arm 10 input by the user, and directs the multi-joint robot arm 10 to move based on the teaching. Specifically, the robot controller 21 receives positions and orientations of control points of the multi-joint robot arm 10, and calculates the movement of each joint of the multi-joint robot arm 10.

The multi-joint robot arm 10 includes six joints 12a, 12b, 12c, 12d, 12e and 12f, and links 13a, 13b, 13c, 13d and 13e connecting the joints to each other as shown in FIG. 2. Each of the six joints 12a to 12f included the electric motor is constructed of a servomotor, and a position detector configured to detect a rotational position of the joint. As shown in FIG. 2, the interactor 30 is attached to one end part of the multi-joint robot arm 10. Also, the multi-joint robot arm 10 includes a base 11 arranged in another end part and installed onto a floor, wall, pillar, etc.

Each of the six joints 12a to 12f is rotated by its electric motor.

The joint 12a of a first axis is connected to the base 11. The joint 12a is configured to rotate a link 13a with respect to the base 11 about a rotation axis A1. The joint 12b of a second axis is configured to rotate a link 13b with respect to the link 13a about a rotation axis A2 orthogonal to the rotation axis A1.

The joint 12c of a third axis is configured to rotate a link 13c with respect to the link 13b about a rotation axis A3 parallel to the rotation axis A2. The joint 12d of a fourth axis is configured to rotate a link 13d with respect to the link 13c about a rotation axis A4 orthogonal to the rotation axis A3.

The joint 12e of a fifth axis is configured to rotate a link 13e with respect to the link 13d about a rotation axis A5 orthogonal to the rotation axis A4. The joint 12f of a sixth axis is configured to rotate the interactor 30 with respect to the link 13e about a rotation axis A6 orthogonal to the rotation axis A5.

The interactor 30 interacts with the workpiece 200. The interactor 30 includes at least one of an applicator, an affixer, a sprayer, a welder, a joiner, a grinder, a cutter, and a picker, for example.

The interactor 30 interacts with the workpiece 200 while moving relative to the workpiece 200. For example, the applicator applies a material to be applied onto the workpiece 200 while moving relative to the workpiece 200. Also, the applicator is supplied with an application substance as a material from the material supplier 50, and applies the supplied material onto the workpiece 200. For example, the application substance is a liquid or paste-like material such as adhesive, sealant, reagent, paint, solder, or the like.

The affixer affixes an affixation substance onto the workpiece 200 while moving relative to the workpiece 200. Also, the affixer is supplied with the affixation substance as a material from the material supplier 50, and affixes the supplied material onto the workpiece 200. For example, the affixation substance is a sealant, a seal, a piece of tape, a combined substance such as prepreg, or the like. The sprayer sprays a spray substance onto the workpiece 200 while moving relative to the workpiece 200. Also, the sprayer is supplied with the spray substance as a material from the material supplier 50, and sprays the spray substance onto the workpiece 200. For example, the spray substance is a liquid material such as adhesive, medicine, paint, or the like.

The welder welds the workpiece 200 while moving relative to the workpiece 200. Also, the welder is supplied with a welding material from the material supplier 50, and welds the workpiece 200 by using the welding material. Alternatively, the welder can weld the workpiece 200 while irradiating the workpiece with a laser to melt the workpiece. The joiner joins parts of the workpiece 200 together while moving relative to the workpiece 200. Also, the joiner joins parts of the workpiece 200 together while irradiating the workpiece with a laser.

The grinder grinds the workpiece 200 while moving relative to the workpiece 200. The cutter cuts the workpiece 200 while moving relative to the workpiece 200. The picker picks up the workpiece 200 while moving relative to the workpiece 200.

The interaction controller 40 is configured and programmed to control interaction of the interactor 30 with the workpiece 200. The interaction controller 40 is configured or programmed to control supplying of the material from the material supplier 50 based on a moving amount signal that is output from the signal output 22. In a case in which the interactor 30 is the applicator, the interaction controller 40 is configured or programmed to control application timing of the application substance and an application amount of the application substance by the interactor 30.

In a case in which the interactor 30 is an affixer, the interaction controller 40 is configured or programmed to control affixation timing of the affixation substance and an affixation amount of the affixation substance by the interactor 30. In a case in which the interactor 30 is the sprayer, the interaction controller 40 is configured or programmed to control spraying timing of the spray substance and a spraying amount of the spray substance by the interactor 30.

In a case in which the interactor 30 is a welder, the interaction controller 40 is configured or programmed to control welding timing and a welding amount by the interactor 30. In a case in which the interactor 30 is the joiner, the interaction controller 40 is configured or programmed to control joining timing and a joining amount by the interactor 30.

In a case in which the interactor 30 is the grinder, the interaction controller 40 is configured or programmed to control grinding timing and a grinding amount by the interactor 30. In a case in which the interactor 30 is the cutter, the interaction controller 40 is configured or programmed to control cutting timing and a cutting amount by the interactor 30.

In a case in which the interactor 30 is the picker, the interaction controller 40 is configured or programmed to control timing of picking up the workpiece 200 and a moving amount of the workpiece by the interactor 30.

Here, the interaction controller 40 is configured or programmed to control interaction of the interactor 30 with the workpiece 200 based on the moving amount signal, which is output by the signal output 22 of the controller 20.

Also, the interaction controller 40 is configured or programmed to control at least one of an interaction amount of the interactor 30, an interaction speed of the interactor 30, and an interaction acceleration of the interactor 30 based on the moving amount signal output from the signal output 22.

Also, the interaction controller 40 is configured or programmed to control the interaction amount, the interaction speed or the interaction acceleration of the interactor 30 in accordance with movement of the interactor 30.

Also, the signal output 22 outputs the moving amount signal based on a moving amount of the interactor 30 arranged on a distal end part of the multi-joint robot arm 10 at a fixed time period.

Specifically, the signal output 22 outputs the moving amount signal as pulse signals based on the moving amount of the interactor 30 at the fixed time period. For example, as shown in FIG. 3, the signal output 22 outputs the moving amount signal as the pulse signals including pulses the number of which depends on the moving amount of the interactor 30 at the fixed time period.

In an exemplary chart shown in FIG. 3, in a case in which a moving amount of a distal end of the interactor 30 is 2 d in a period from time t0 to time t1, the signal output part 22 generates and outputs two pulses at time t1. In a case in which a moving amount of the distal end of the interactor 30 is 3 d in a period from time t1 to time t2, the signal output part 22 generates and outputs three pulses at time t2. In a case in which a moving amount of the distal end of the interactor 30 is d in a period from time t2 to time t3, the signal output part 22 generates and outputs one pulse at time t3.

Also, the signal output 22 outputs the moving amount signal at a control cycle as the fixed time period. In an exemplary chart of FIG. 3, a control cycle is 2 msec, and a moving amount is acquired in each control cycle so that pulse signals are output based on the moving amount. A frequency of the output pulse is 1 MHz, for example. One pulse is generated for each movement of 0.1 mm, for example.

The signal output 22 includes an FPGA (field Programmable Gate Array) for example, and performs processing by using the FPGA.

If the CPU that controls the multi-joint robot arm 10 directly controls the pulse output function, a load on the CPU can be increased, and as a result the CPU cannot accurately control high frequency pulses on some occasions. For this reason, another processor for controlling pulses such as an FPGA provided separately from the CPU, which controls the multi-joint robot arm 10, is used to control outputting of pulses.

The interaction controller 40 is configured or programmed to calculate an operating path length by accumulating the moving amount of the interactor 30 based on the moving amount signal output from the signal output 22, and to determine abnormality based on the operating path length and the interaction amount of the interactor 30. Specifically, the interaction controller 40 is configured or programmed to compare a value based on the operating path length with a value based on the interaction amount of the interactor 30 so as to determine the abnormality if a difference between the values is equal to or greater than a predetermined threshold.

The interaction controller 40 can calculate a required interaction amount based on the operating path length and compare an interaction amount that is calculated based on the operating path length with an actual interaction amount to determine the abnormality, or can calculate a suitable operating path length based on the interaction amount of the interactor 30 and compare an operating path length that is calculated based on the operating path length with an operating path length to determine the abnormality.

Also, if determining that the interactor 30 is abnormal, the interaction controller 40 is configured or programmed to inform an operator that the abnormality occurs. Alternatively, the interaction controller 40 can be configured or programmed to halt interaction of the interactor 30 if the abnormality occurs.

The interaction amount can be calculated based on an amount of the material supplied from the material supplier 50, for example.

The moving amount of the interactor 30 relative to the workpiece 200 is acquired based on the movement of the control points TCP for controlling the movement of the multi-joint robot arm 10. The control point TCP to control the movement of the multi-joint robot arm 10 is set, for example, to the interaction position of the interactor 30 relative to the workpiece 200.

In a case in which the interactor 30 is an applicator, the control points TCP are specified by application positions of the interactor 30. In a case in which the interactor 30 is an affixer, the control points TCP are specified by affixation positions of the interactor 30. In a case in which the interactor 30 is a welder, the control points TCP are specified by welding positions of the interactor 30.

Advantages of First Embodiment

In the first embodiment, the following advantages are obtained.

In the first embodiment, as described above, the signal output 22 configured to output a moving amount signal based on a moving amount of the interactor 30 arranged on a distal end part of the multi-joint robot arm 10 at a fixed time period is provided. Also, the interaction controller 40 configured or programmed to control interaction of the interactor 30 with the workpiece 200 based on the moving signal output by the signal output 22. Accordingly, the interaction controller 40 can acquire the moving amount of the interactor 30 at a fixed time period, and can control interaction of the interactor 30 in synchronization with movement of the interactor 30. As a result, it is possible to accurately interact with the workpiece 200 by using the interactor 30 when interacting with the workpiece while moving the interactor 30 relative to the workpiece 200 by using the multi-joint robot arm 10. In addition, because the moving amount signal is output at the fixed time period, the interaction controller 40 can stably control interaction at the fixed time period. Consequently, it is possible to prevent delay in control.

In the first embodiment, as described above, the signal output 22 outputs the moving amount signal based on the moving amount of the interactor 30 as a pulse signal depending on the moving amount at the fixed time period. Accordingly, because the pulse signals are output based on the moving amount of the interactor 30 in the fixed time period, a moving velocity of the interactor 30 can be acquired based on the moving amount signal of the pulse signals.

In the first embodiment, as described above, the signal output 22 outputs the moving amount signal based on the moving amount of the interactor 30 as the pulse signal including pulses the number of which depends on the moving amount at the fixed time period. Accordingly, the moving velocity of the interactor 30 can be easily acquired by counting the number of pulses of the pulse signal in the fixed time period.

In the first embodiment, as described above, the interaction controller 40 is configured or programmed to control supplying of the material from the material supplier 50 based on the moving amount signal output from the signal output 22. According to the synchronization with movement of the interactor 30, the material supply supplied from the material supplier 50 can be neither too much nor too little.

In the first embodiment, as described above, the interaction controller 40 is configured or programmed to control at least one of an interaction amount of the interactor 30, an interaction speed of the interactor 30, and an interaction acceleration of the interactor 30 based on the moving amount signal output from the signal output 22. Accordingly, unevenness of interaction of the interactor 30 can be prevented by controlling at least one of the interaction amount of the interactor 30, the interaction speed of the interactor 30, and the interaction acceleration of the interactor 30 to synchronize the interaction of the interactor with movement of the interactor 30.

In the first embodiment, as described above, the interaction controller 40 is configured or programmed to calculate an operating path length by accumulating the moving amount of the interactor 30 based on the moving amount signal output from the signal output 22, and to determine abnormality based on the operating path length and the interaction amount of the interactor 30. Accordingly, even in a case in which an operating path length of the interactor 30 is changed by the multi-joint robot arm 10, it is possible to accurately detect abnormality to respond to the change of operating path length of the interactor 30 in real time.

In the first embodiment, as described above, the interaction controller 40 is configured or programmed to compare a value based on the operating path length with a value based on the interaction amount of the interactor 30 so as to determine the abnormality if a difference between the values is equal to or greater than a predetermined threshold. Accordingly, it is possible to accurately determine abnormality due to occurrence that the interaction amount of the interactor 30 becomes too much nor too little.

In the first embodiment, as discussed above, the signal output 22 outputs a plurality of moving amount signals as the moving amount signal based on moving amounts of a plurality of movement points of the interactor 30 arranged on the distal end part of the multi-joint robot arm 10; and the interaction controller 40 is configured or programmed to calculate a plurality of operating path lengths as the operating path length by accumulating the moving amounts of the plurality of movement points of the interactor 30 based on the moving amount signal output from the signal output 22, and to compare a value based on each of the plurality of the operating path lengths with a value based on each of the plurality of interaction amounts of the interactor 30 at the plurality of movement points so as to individually determine the abnormality if a difference between the values is equal to or greater than a predetermined threshold. Accordingly, it possible to determine abnormality in each of the plurality of movement points of the interactor 30.

In the first embodiment, as described above, the signal output 22 outputs the moving amount signal at a control cycle as the fixed time period. Accordingly, because the moving amount signal is output at a control cycle, interaction of the interactor can be easily controlled so as to synchronize with movement of the interactor 30.

Second Embodiment

Figures 5, 6:
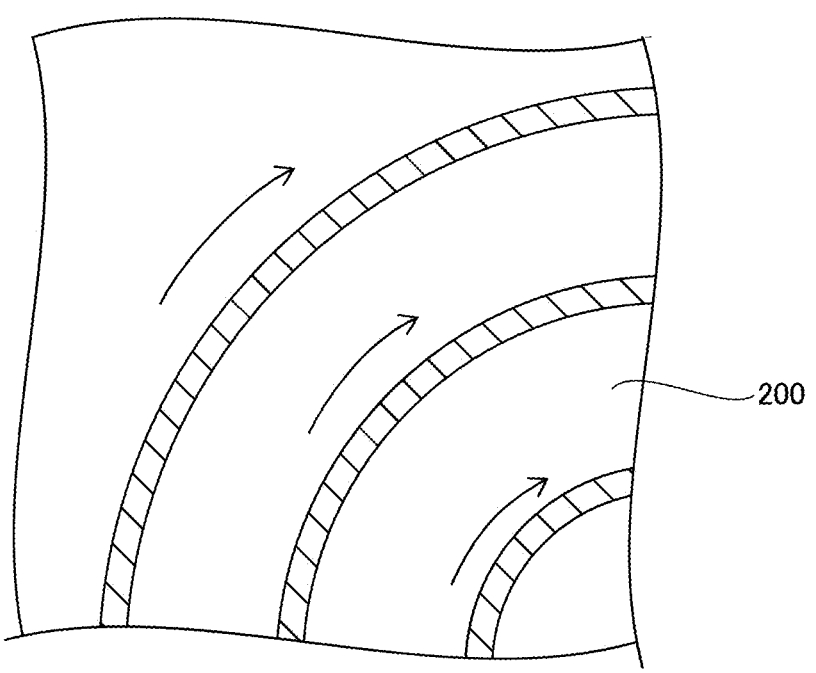
FIG. 5 is a diagram illustrating interaction of an interactor of the robot system according to the second embodiment.
FIG. 6 is a diagram schematically showing a robot system according to a third embodiment.

The following description describes a robot system 100 according to a second embodiment with reference to FIGS. 4 and 5.

As shown in FIG. 4, the robot system 100 interacts with a workpiece 200. The robot system 100 includes a multi-joint robot arm 10, and a controller 20 configured or programmed to control the multi-joint robot arm 10. The robot system 100 further includes an interactor 30, and an interaction controller 40 configured or programmed to control the interactor 30. The robot system 100 further includes a plurality of material suppliers 50 configured to supply materials for interaction of the interactor 30, which interacts at a plurality of interaction positions.

The interactor 30 concurrently interacts at the plurality of interaction positions in the interactor 30. For example, as shown in FIG. 5, the interactor 30 interacts at the plurality of interaction positions in a width direction orthogonal to a moving direction while moving relative to the workpiece 200.

In this interaction, the signal output 22 outputs a plurality of moving amount signals as the moving amount signal based on moving amounts of a plurality of movement points of the interactor 30 arranged on the distal end part of the multi-joint robot arm 10. Also, the interaction controller 40 is configured or programmed to individually control interaction of the interactor 30 with the workpiece 200 at each of the plurality of movement points based on corresponding one of the plurality of moving amount signals.

Specifically, in a case in which a surface of the workpiece 200 is curved, for example, and the interactor 30 interacts with the workpiece 200 while moving in a curved shape such as an arc along the curved surface, a difference between processing path lengths of inside and outside curved lines in width direction appears. In this case, the interaction positions of the interactor 30 are previously specified in the robot controller 21. Accordingly, moving amounts of the positions are calculated in the fixed time period, and pulse signals corresponding to the moving amounts are output to the interaction controller 40 at a control cycle of the controller 20.

The interaction controller 40 is configured and programmed to control supply of each of the materials in of the plurality of material suppliers 50 in real time based on the pulse signals of each of the plurality of interaction positions received from the controller 20. For example, at an interaction position that passes the outside curved line so that its passing velocity becomes high, a supply rate of the material is increased. Contrary to this, at an interaction position that passes the inside curved line so that its passing velocity becomes low, a supply rate of the material is reduced.

Also, the signal output 22 outputs a plurality of moving amount signals as the moving amount signal based on moving amounts of a plurality of movement points of the interactor 30 arranged on the distal end part of the multi-joint robot arm 10. Also, the interaction controller 40 is configured or programmed to calculate a plurality of operating path lengths as the operating path length by accumulating the moving amounts of the plurality of movement points of the interactor 30 based on the moving amount signal output from the signal output 22, and to compare a value based on each of the plurality of the operating path lengths with a value based on each of the plurality of interaction amounts of the interactor 30 so as to determine the abnormality if a difference between the values is equal to or greater than a predetermined threshold.

The other configuration of the second embodiment is similar to the first embodiment.

Advantages of Second Embodiment

In the second embodiment, the following advantages are obtained.

According to the second embodiment, similar to the aforementioned first embodiment, it is possible to accurately interact with the workpiece 200 by using the interactor 30 when interacting with the workpiece while moving the interactor 30 relative to the workpiece 200 by using the multi-joint robot arm 10.

In the second embodiment, as described above, the signal output 22 outputs a plurality of moving amount signals as the moving amount signal based on moving amounts of a plurality of movement points of the interactor 30 arranged on the distal end part of the multi-joint robot arm 10. Also, the interaction controller 40 is configured or programmed to individually control interaction of the interactor 30 with the workpiece 200 at each of the plurality of movement points based on corresponding one of the plurality of moving amount signals. Accordingly, interaction of the interactor 30 can be controlled so as to synchronize with movement of each of the plurality of moving points of the interactor 30, the interactor 30 accurately interact at each movement point.

In the second embodiment, as described above, the signal output 22 outputs a plurality of moving amount signals as the moving amount signal based on moving amounts of a plurality of movement points of the interactor 30 arranged on the distal end part of the multi-joint robot arm 10. Also the interaction controller 40 is configured or programmed to calculate a plurality of operating path lengths as the operating path length by accumulating the moving amounts of the plurality of movement points of the interactor 30 based on the moving amount signal output from the signal output 22, and to compare a value based on each of the plurality of the operating path lengths with a value based on each of the plurality of interaction amounts of the interactor 30 so as to determine the abnormality if a difference between the values is equal to or greater than a predetermined threshold. Accordingly, it possible to determine abnormality in each of the plurality of movement points of the interactor 30.

The other advantages of the second embodiment are similar to the first embodiment.

Third Embodiment

Figure 7:
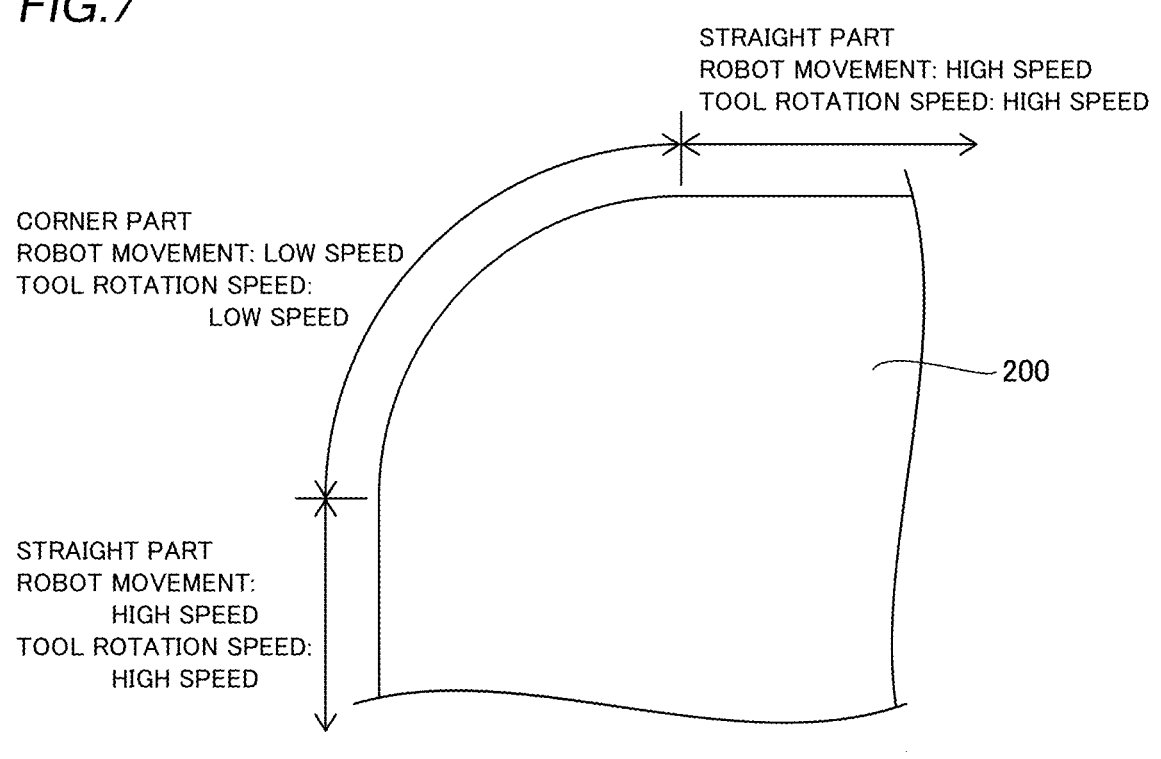
FIG. 7 is a diagram illustrating interaction of an interactor of the robot system according to the third embodiment.

The following description describes a robot system 100 according to a third embodiment with reference to FIGS. 6 and 7.

As shown in FIG. 6, the robot system 100 interacts with a workpiece 200. The robot system 100 includes a multi-joint robot arm 10, and a controller 20 configured or programmed to control the multi-joint robot arm 10. The robot system 100 further includes an interactor 31, and an interaction controller 40 configured or programmed to control the interactor 31. In the third embodiment, the interactor 31 is a cutter for griding or a grinder for griding.

The interactor 31 rotates its distal part to cut or grind the workpiece 200. The interaction controller 40 is configured or programmed to control a rotation speed of the interactor 31 based on a moving velocity of the interactor 31 moved by the multi-joint robot arm 10. In other words, the interaction controller 40 is configured or programmed to control interaction of the interactor 31 with the workpiece 200 based on the moving amount signal output by the signal output 22 at the fixed time period.

In an exemplary case of FIG. 7, the workpiece 200 has a corner part between straight parts. The multi-joint robot arm 10 moves the interactor 31 at a high velocity in the straight parts. The interaction controller 40 is configured or programmed to rotate the interactor 31 at a high rotation speed corresponding to high velocity movement of the interactor 31 in the straight parts.

On the other hand, in the corner part, the multi-joint robot arm 10 moves the interactor 31 at a low velocity. The interaction controller 40 is configured or programmed to rotate the interactor 31 at a low rotation speed corresponding to low velocity movement of the interactor 31 in the corner part. Accordingly, a similar cutting amount can be provided even in a case in which the moving velocity of the interactor 31 changes in the straight parts and the corner part. Consequently, high-quality processing can be achieved.

The other configuration of the third embodiment is similar to the first embodiment.

Advantages of Third Embodiment

In the third embodiment, the following advantages are obtained.

According to the third embodiment, similar to the aforementioned first embodiment, it is possible to accurately interact with the workpiece 200 by using the interactor 31 when interacting with the workpiece while moving the interactor 31 relative to the workpiece 200 by using the multi-joint robot arm 10.

The other advantages of the third embodiment are similar to the first embodiment.

Fourth Embodiment

Figure 8:
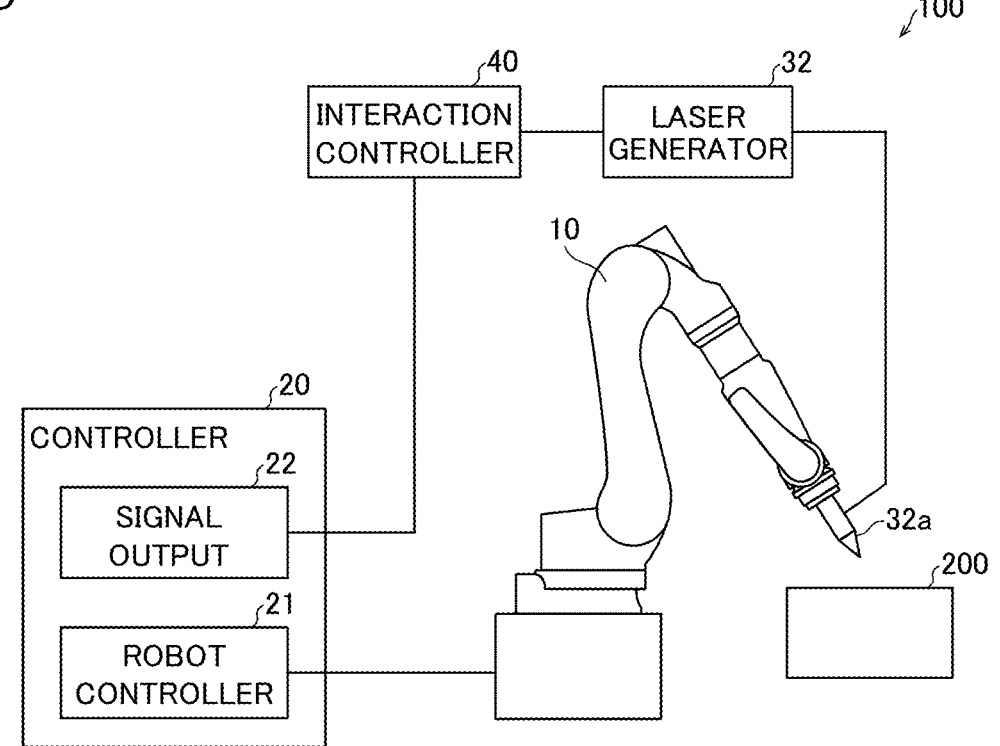
FIG. 8 is a diagram schematically showing a robot system according to a fourth embodiment.

The following description describes a robot system 100 according to a fourth embodiment with reference to FIGS. 8 and 9.

As shown in FIG. 8, the robot system 100 interacts with a workpiece 200. The robot system 100 includes a multi-joint robot arm 10, and a controller 20 configured or programmed to control the multi-joint robot arm 10. The robot system 100 further includes a laser generator 32 and a laser head 32*a* as an interactor, and an interaction controller 40 configured or programmed to control laser generation of the laser generator 32. Also, in the fourth embodiment, the interactor welds or joins the workpiece 200 by using a laser.

The laser generator 32 irradiates the workpiece 200 with the laser from the laser head 32*a*. Accordingly, the workpiece 200 is melted to be welded or joined. The interaction controller 40 is configured or programmed to control laser output power and a laser output frequency based on a moving velocity of the laser head 32*a* moved by the multi-joint robot arm 10. In other words, the interaction controller 40 is configured or programmed to control interaction of the interactor with the workpiece 200 based on the moving amount signal output by the signal output 22 at the fixed time period.

In an exemplary case of FIG. 9, the workpiece 200 has a corner part between straight parts. The multi-joint robot arm 10 moves the laser head 32*a* at a high velocity in the straight parts. Also, the interaction controller 40 is configured or programmed to increase the frequency of the laser generated from the laser generator 32 in the straight parts. Also, the interaction controller 40 is configured or programmed to increase the output of the laser generated from the laser generator 32 in the straight parts.

On the other hand, in the corner part, the multi-joint robot arm 10 moves the laser head 32*a* at a low velocity. Also, the interaction controller 40 is configured or programmed to reduces the frequency of the laser generated from the laser generator 32 in the corner part. Also, the interaction controller 40 is configured or programmed to reduces the output power of the laser generated from the laser generator 32 in the corner part. Accordingly, laser output timing and a heat input amount input by the laser output can be adjusted even in a case in which the moving velocity of the laser head 32*a* changes between the straight parts and the corner part. Consequently, high-quality processing can be achieved.

In an exemplary case of FIG. 10, a welding or joining pitch is changed between the straight parts and the corner part. The welding or joining pitch is reduced in the straight parts, and the welding or joining pitch is increased in the corner part.

The other configuration of the fourth embodiment is similar to the first embodiment.

Advantages of Fourth Embodiment

In the fourth embodiment, the following advantages are obtained.

According to the fourth embodiment, similar to the aforementioned first embodiment, it is possible to accurately interact with the workpiece 200 by using the interactor when interacting with the workpiece while moving the interactor relative to the workpiece 200 by using the multi-joint robot arm 10.

The other advantages of the fourth embodiment are similar to the first embodiment.

Fifth Embodiment

Figures 11, 12:
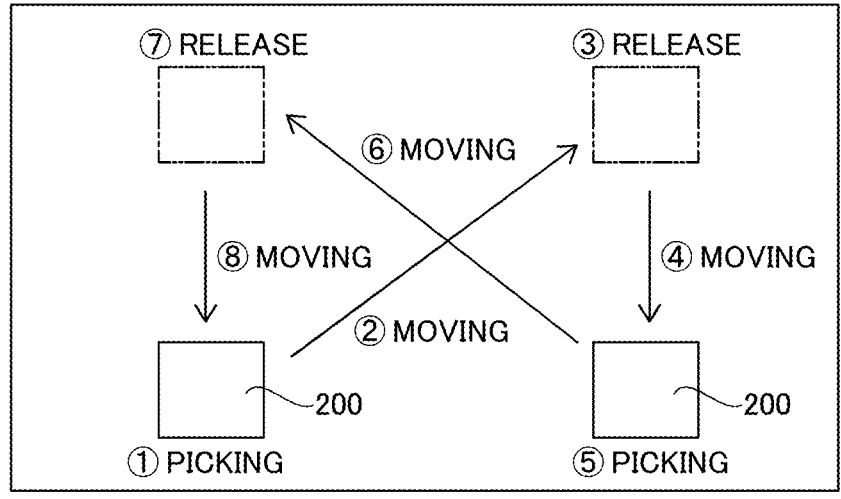
FIG. 11 is a diagram schematically showing a robot system according to a fifth embodiment.
FIG. 12 is a diagram illustrating interaction of an interactor of the robot system according to the fifth embodiment.
Figure 13:
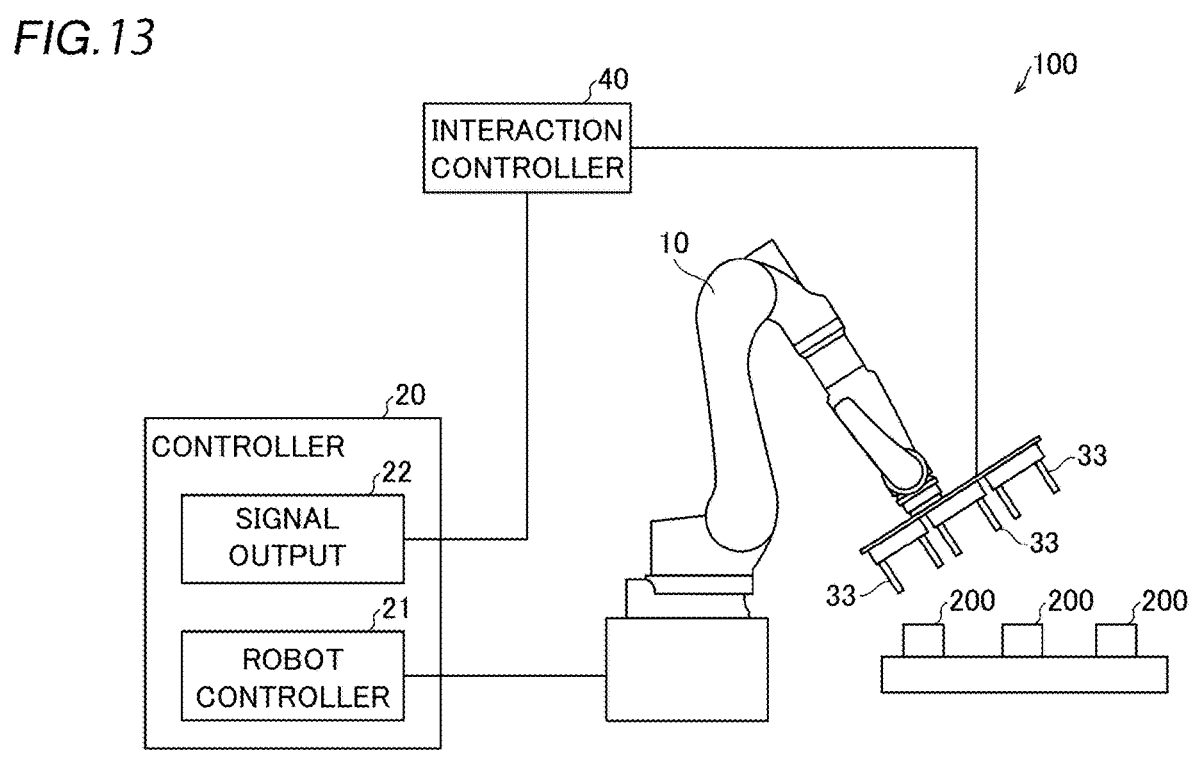

The following description describes a robot system 100 according to a fifth embodiment with reference to FIGS. 11 and 13.

As shown in FIG. 11, the robot system 100 interacts with a workpiece 200. The robot system 100 includes a multi-joint robot arm 10, and a controller 20 configured or programmed to control the multi-joint robot arm 10. The robot system 100 further includes an interactor 33, and an interaction controller 40 configured or programmed to control the interactor 33. In the fifth embodiment, the interactor 33 is a hand to pick up the workpiece 200.

The interactor 33 picks up the workpiece 200 by opening and closing claws of a hand. For example, the robot system 100 picks up the workpiece 200 in a lower left position, moves the workpiece to an upper right position, and then releases the workpiece as shown in FIG. 12. Also, the robot system picks up the workpiece 200 after moving the workpiece to a lower right position, moves the workpiece to an upper left position, and then releases the workpiece. After that, the robot system moves the workpiece to the lower left position, and repeats the picking, the moving and the releasing. Alternatively, the interactor 33 can detect the workpiece 200 randomly placed on a path of the interactor configured to pick up the workpiece.

The interactor 33 picks up and releases the workpiece 200 on an operating path while moving at a high velocity without stopping. In this case, the interaction controller 40 is configured or programmed to control an opening/closing speed and a gripping force of the claws of the hand based on a moving velocity of the interactor 33 moved by the multi-joint robot arm 10. Specifically, in a case in which the moving velocity of the interactor 33 is high, the opening/closing speed of the claws is set high, and the gripping force is increased. On the other hand, in a case in which the moving velocity of the interactor 33 is low, the opening/closing speed of the claws is set low, and the gripping force is reduced. Accordingly, the workpiece 200 can be accurately picked up and released by the interactor 33 even in a case in which the moving velocity of the interactor is changed without stopping the multi-joint robot arm 10. As a result, interaction time can be reduced.

Also, as shown in FIG. 13, a plurality of interactors 33 can be attached to the distal end of the multi-joint robot arm 10 to grasp and convey a plurality of workpieces 200 at the same time. In this case, the signal output 22 outputs a plurality of moving amount signals as the moving amount signal based on moving amounts of movement points of the plurality of interactors 33 arranged on the distal end part of the multi-joint robot arm 10.

The other configuration of the fifth embodiment is similar to the first embodiment.

Advantages of Fifth Embodiment

In the fifth embodiment, the following advantages are obtained.

According to the fifth embodiment, similar to the aforementioned first embodiment, it is possible to accurately interact with the workpiece 200 by using the interactor 33 when interacting with the workpiece while moving the interactor 33 relative to the workpiece 200 by using the multi-joint robot arm 10.

The other advantages of the fifth embodiment are similar to the first embodiment.

Modified Embodiments

Note that the embodiment disclosed this time must be considered as illustrative in all points and not restrictive. The scope of the present disclosure is not shown by the above description of the embodiments but by the scope of claims for patent, and all modifications within the meaning and scope equivalent to the scope of claims for patent are further included.

While the example in which the interactor is arranged on the distal end part of the multi-joint robot arm, and the interactor is moved relative to the workpiece by moving the end effector by using the multi-joint robot arm has been shown in the aforementioned first to fifth embodiments, the present disclosure is not limited to this. In this disclosure, alternatively, the workpiece can be arranged on the distal end part of the multi-joint robot arm, and the interactor can be moved relative to the workpiece by moving the workpiece by using the multi-joint robot arm. In the case in which the workpiece is arranged on the distal end part of the multi-joint robot arm, an end effector can be arranged on the distal end part of the multi-joint robot arm so that the workpiece can be grasped by the end effector.

Alternatively, the interactor and the workpiece can be arranged on distal end parts of a plurality of multi-joint robot arms, and the interactor can be moved relative to the workpiece by moving both the interactor and the workpiece by using the multi-joint robot arms.

While the example in which the multi-joint robot arm includes six vertical joints has been shown in the aforementioned first to fifth embodiments, the present disclosure is not limited to this. In the present disclosure, the multi-joint robot arm can include five or less joints, or seven or more joints.

While the example in which a moving amount of the workpiece is acquired based on movement of control points of the multi-joint robot arm has been shown in the aforementioned first to fifth embodiments, the present disclosure is not limited to this. In this disclosure, the moving amount of the workpiece can be acquired based on a moving amount of any position of the multi-joint robot arm.

While the example in which the robot controller and signal output are separately included in a common controller has been shown in the aforementioned first to fifth embodiments, the present disclosure is not limited to this. In the present disclosure, alternatively, the robot controller and the signal output can be installed in separated controllers. Also, the signal output can be provided in a common controller together with the robot controller by adding hardware or can be provided in a common controller together with the robot controller by adding software.

Functions of elements disclosed in this specification can be realized by circuitry or processing circuitry including a general purpose processor, a dedicated processor, an integrated circuit, ASIC (Application Specific Integrated Circuits), a conventional circuit and/or combination of them configured or programmed to realize the functions disclosed. Because processors include transistors and other circuits, they are considered as a processing circuit or a circuit. In the present disclosure, circuits, units or means are hardware for realizing the functions stated above, or hardware programmed to realize the functions stated above. The hardware can be hardware disclosed in this specification, or can be other known hardware programed or configured to realize the functions stated above. In the case in which the hardware is a processor that can be considered as one type of circuits, the circuit, means or unit is a combination of hardware and software, and the software is used for configuration of the hardware and/or the processor.

DESCRIPTION OF REFERENCE NUMERALS

10; multi-joint robot arm
21; robot controller
22; signal output
30; interactor
40; interaction controller
50; material supplier
100; robot system
200; workpiece

The invention claimed is:

1. A robot system comprising:
   a multi-joint robot arm including a plurality of joints;
   a robot controller configured or programmed to control movement of the multi-joint robot arm;
   an interactor configured to interact with a workpiece;
   a signal output configured to output a moving amount signal at an end of each fixed time period, the moving amount signal being based on a moving amount of the workpiece or the interactor arranged on a distal end part of the multi-joint robot arm during a respective fixed time period; and
   an interaction controller configured or programmed to control interaction of the interactor with the workpiece based on the moving amount signal output by the signal output, wherein
   the signal output outputs the moving amount signal as pulse signals, a number of pulses in each fixed time period corresponding to the moving amount detected within a respective fixed time period.

2. The robot system according to claim 1, further comprising a material supplier configured to supply a material for the interaction to the interactor, wherein
   the interaction controller is configured or programmed to control supplying of the material from the material supplier based on the moving amount signal output from the signal output.

3. The robot system according to claim 1, wherein the interaction controller is configured or programmed to control at least one of an interaction amount of the interactor, an interaction speed of the interactor, and an interaction acceleration of the interactor based on the moving amount signal output from the signal output.

4. The robot system according to claim 1, wherein the signal output outputs a plurality of moving amount signals as the moving amount signal based on moving amounts of a plurality of movement points of the workpiece or the interactor arranged on the distal end part of the multi-joint robot arm; and the interaction controller is configured or programmed to individually control interaction of the interactor with the workpiece at each of the plurality of movement points based on corresponding one of the plurality of moving amount signals.

5. The robot system according to claim 1, wherein the interaction controller is configured or programmed to calculate an operating path length by accumulating the moving amount of the workpiece or the interactor based on the moving amount signal output from the signal output, and to determine abnormality based on the operating path length and an interaction amount of the interactor.

6. The robot system according to claim 5, wherein the interaction controller is configured or programmed to compare a value based on the operating path length with a value based on the interaction amount of the interactor so as to determine the abnormality if a difference between the values is equal to or greater than a predetermined threshold.

7. The robot system according to claim 5, wherein the signal output outputs a plurality of moving amount signals as the moving amount signal based on moving amounts of a plurality of movement points of the workpiece or the interactor arranged on the distal end part of the multi-joint robot arm; and the interaction controller is configured or programmed to calculate a plurality of operating path lengths as the operating path length by accumulating the moving amounts of the plurality of movement points of the workpiece or the interactor based on the moving amount signal output from the signal output, and to compare a value based on each of the plurality of the operating path lengths with a value based on each of the plurality of interaction amounts of the interactor at the plurality of movement points so as to individually determine the abnormality if a difference between the values is equal to or greater than a predetermined threshold.

8. The robot system according to claim 1, wherein the signal output outputs the moving amount signal at a control cycle as the fixed time period.

9. A robot comprising:

a multi-joint robot arm including a plurality of joints;

a robot controller configured or programmed to control movement of the multi-joint robot arm; and a signal output configured to output a moving amount signal at an end of each fixed time period, the moving amount signal being based on a moving amount of a workpiece arranged on a distal end part of the multi-joint robot arm or an interactor arranged on the distal end part of the multi-joint robot arm to interact with the workpiece during a respective fixed time period, wherein the signal output outputs the moving amount signal as pulse signals, a number of pulses in each fixed time period corresponding to the moving amount detected within a respective fixed time period.

10. The robot according to claim 9, wherein the moving amount signal is used to control supply of a material for the interaction to the interactor from a material supplier.

* * * * *